Dec. 26, 1961                F. MARTI ET AL                3,014,959
                         PRODUCTION OF VINYL ESTERS
Filed Oct. 20, 1958                                    2 Sheets-Sheet 1
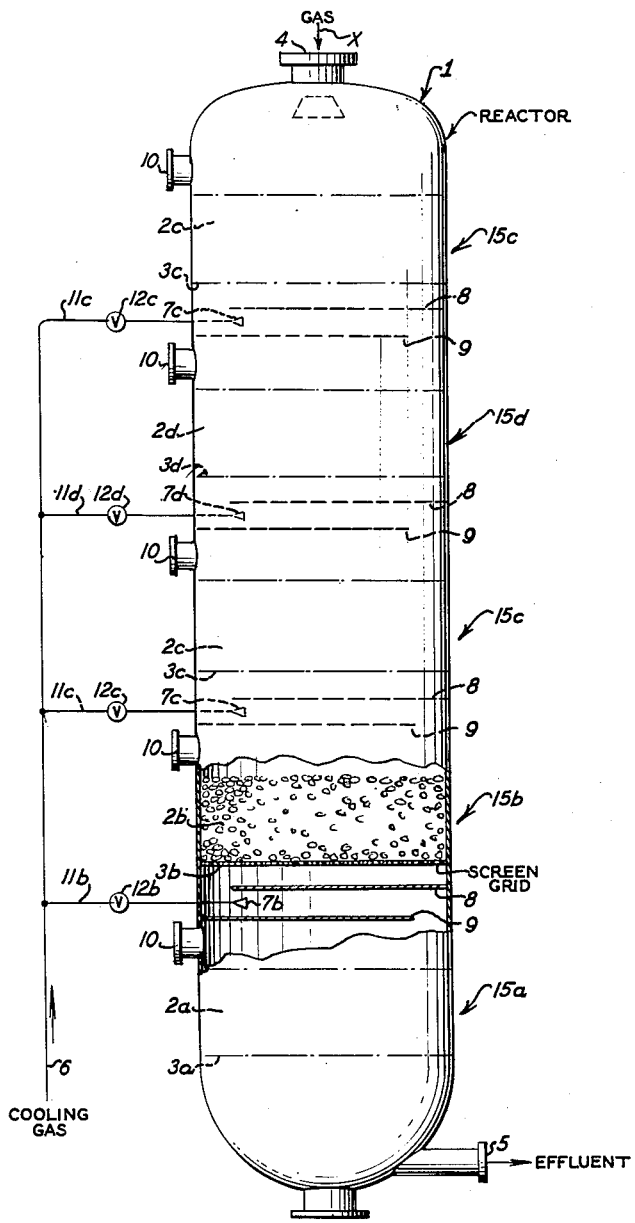
INVENTORS
FRITZ MARTI
RAYMOND PERRIN
BY
          ATTORNEYS

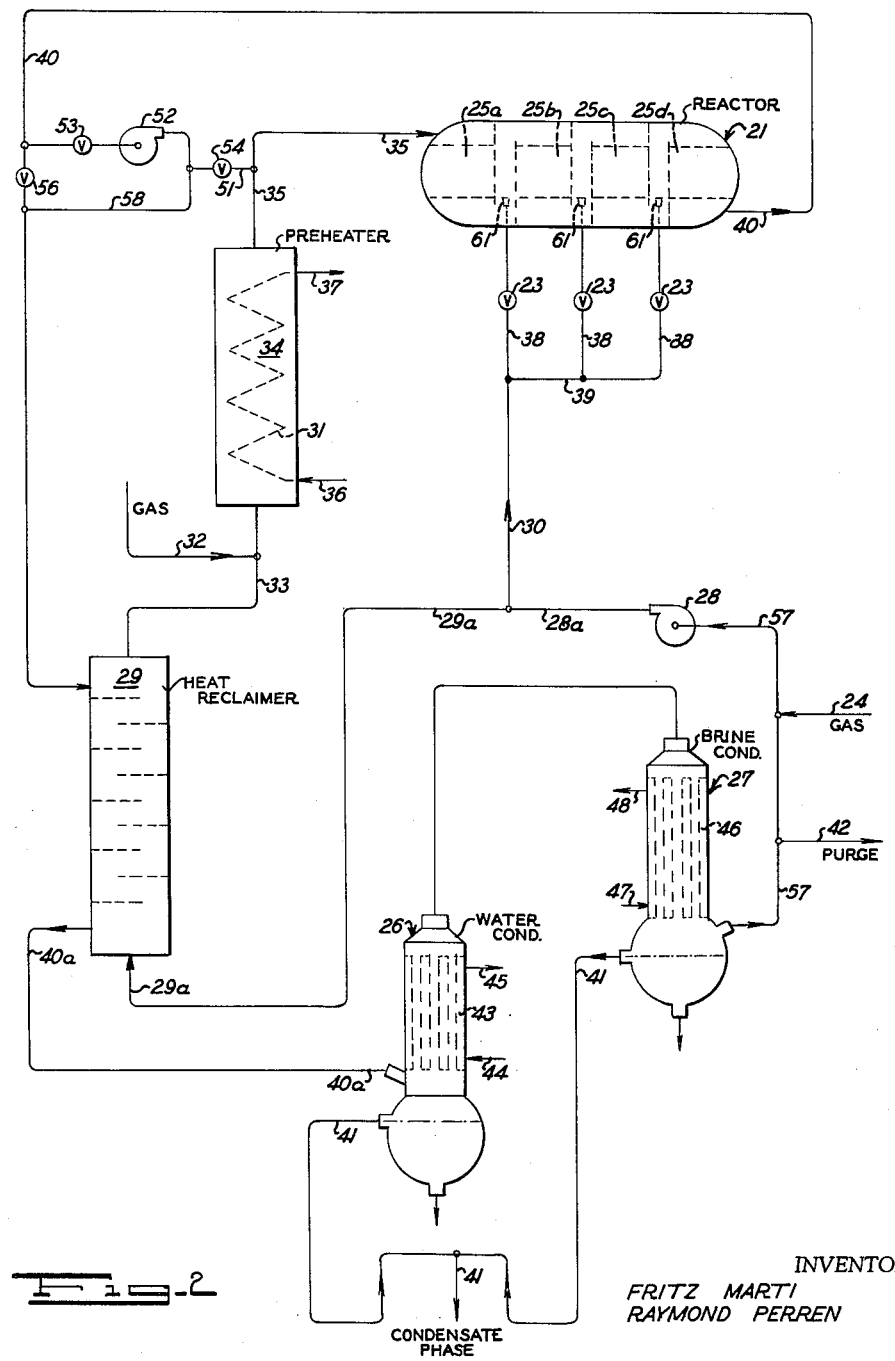

United States Patent Office 3,014,959
Patented Dec. 26, 1961

3,014,959
PRODUCTION OF VINYL ESTERS
Fritz Marti, Basel, and Raymond Perren, Allschwil, Switzerland, assignors to Lonza Electric and Chemical Works Ltd., Basel, Switzerland
Filed Oct. 20, 1958, Ser. No. 768,394
Claims priority, application Switzerland Oct. 21, 1957
13 Claims. (Cl. 260—498)

This invention relates to the production of vinyl compounds, and the invention has as its object to provide an improved method for the production of such compounds.

It is already known to prepare vinyl compounds, such as vinyl esters and vinyl chloride by passing acetic acid or hydrogen halide, e.g. hydrogen chloride, over catalysts at elevated temperatures, thereafter removing the vinyl compounds formed from the reaction gases by cooling and recycling the uncondensed gases, primarily acetylene, back into the process.

With due regard to the life of the catalyst and a good yield of the process, the reaction is carried out within the smallest possible temperature range. In order to avoid large increases in the temperature of the catalyst as a result of the exothermal reaction, it is therefore necessary to remove the heat of reaction from the reaction zone as rapidly as possible.

One known method of removing heat consists in arranging the catalyst on cooled surfaces, for instance inside or outside of tubes. In this case, a temperature which is somewhat uniform can be maintained only in case of small distances between the cooling surfaces, i.e., small tube diameters or tube spacings, as a result of which, in view of the narrow space conditions, the danger of clogging is great and the replacement of the spent catalyst difficult.

Furthermore, it has been proposed in industrially similar processes that the catalyst be divided into a plurality of beds and the reaction gases be passed through a cooler between adjacent catalyst beds. With this arrangement it is found that, for instance, the catalysts customary for vinyl acetate or vinyl chloride, namely zinc acetate on activated carbon and mercury sublimate, are sublimated away from the activated-carbon carrier and precipitated on the cold cooling surface, forming an insulating covering; as a result of this, the efficiency of the coolers is rapidly reduced. This disadvantage can only be avoided by small temperature differences between the reaction gas and the cooling medium. Cooling systems operated with liquids, for instance oil or water under pressure, because of the high operating temperatures (up to 220° C. in the case of vinyl acetate) furthermore have the disadvantage of a high heat content of their own, which, for instance in the case of disturbances makes it difficult to rapidly reduce the gas temperature.

All of these methods are therefore cumbersome to carry out and require costly apparatus so that the economy of the process is greatly impaired.

According to the invention, vinyl esters and vinyl halides are produced by passing a first portion of reactant gas comprising as reactants acetylene and a lower aliphatic carboxylic acid or a hydrogen halide serially through two spaced catalyst beds, and introducing a second portion of the reactant gas intermediate the catalyst beds and admixing the first and second portions and flowing the resulting admixture through the second catalyst bed. The second portion of reactant gas at the time of said admixing is at a lower temperature than the temperature of the first portion at the time of the admixing and thus heat of reaction is removed from the first portion and the first portion is cooled before being passed through the second catalyst bed and the temperature rise of reactant gas passed through the catalyst beds is limited.

The cooling gas, i.e. the gas introduced intermediate the catalyst beds to cool reactant gas flowing serially through the beds, can be fresh reactant gas or recycled gas or can be a mixture of fresh gas and recycled gas. Recycled gas can be obtained by cooling reactant gas, following its passage through the catalyst beds, to separate therefrom vinyl compound product and form a cold gaseous phase containing a large proportion of unreacted acetylene. The cold gaseous phase can be recycled to the catalyst beds. Desirably, at least part of this cold gaseous phase is employed as cooling gas, and the portion not employed in this manner, is mixed with fresh gas, preheated, and then passed through the catalyst beds.

The method of the invention is suitable for the production of vinyl esters of lower aliphatic carboxylic acids and vinyl halides. Thus, the method can be employed to produce vinyl formate, vinylpropionate, vinyl chloride, and vinyl acetate.

The method of the invention can advantageously be employed for the production of vinyl acetate from a reaction gas which is an admixture of acetylene and acetic acid. The reaction to produce the vinyl acetate can be carried out so that the reaction temperature is in the range of 130 to 240° C. and the temperature rise during the reaction can, according to the invention, be limited to a rise in temperature of 1–12° C. Desirably, the temperature rise can be limited to a rise of from 1–3° C.

The effectiveness of the method of the invention is surprising as it is not to be expected that mixing of reactant gas and cooling gas in suitable short mixing times would be effective to thoroughly mix the gases so as to prevent local overheating of the catalyst which would cause caking or destruction of the catalyst.

The invention will be further described with reference to the accompanying drawings, in which:

FIG. 1 is a schematic representation of a reactor and associated piping which can be employed in aid of carrying out the method of the invention; and FIG. 2 is a flow sheet wherein there is depicted a method of producing vinyl compounds according to the invention.

Referring to FIG. 1, there is there shown a reactor formed by a vessel 1 having positioned therein at spaced intervals along its length screen grids 3a, 3b, 3c, 3d and 3e. Disposed on each screen grid is a layer of catalyst 2a, 2b, 2c, 2d and 2e, the height of the catalyst layers being less than the distance between any of the screen grids 3a–e so as to provide a plurality of serially connected spaced reaction zones 15a, 15b, 15c, 15d and 15e, each reaction zone containing one of the catalyst beds 2a–e. The vessel is provided with an inlet opening 4 through which reaction gas can be introduced, and a discharge opening 5, through which effluent from the serially connected catalyst beds can be discharged, and also includes hand holes 10, through which catalyst can be removed and charged. To provide for removal of heat of reaction according to the invention by admixing cooling gas with the reaction gas which flows serially through the catalyst beds, there is provided a cooling gas header 6, to which there are connected a plurality of branch lines 11b, 11c, 11d and 11e. The branch lines 11b, 11c, 11d and 11e are arranged to receive cooling gas from the header and conduct the cooling gas to the spaces within the reactor 1 which are intermediate the catalyst beds. Each branch line 11b, 11c, 11d and 11e is provided with a corresponding discharge nozzle 7b, 7c, 7d and 7e and a corresponding valve 12b, 12c, 12d and 12e which permits controlling the amount of cooling gas delivered to the various spaces intermediate the catalyst beds 2a–e. To facilitate good mixing of cooling gas with reception gas issuing from each of the catalyst beds, there are disposed in the space between adjacent catalyst beds, the baffles 8 and 9.

Employing the method of the invention, with a reactor such as is shown in FIG. 1, it is possible in a simple manner to operate with very small temperature differences, for instance only 1 to 12° C. and preferably 1 to 3° C., within the entire reaction space. In many processes, e.g. in the production of vinyl acetate, efficiency decreases with the passage of time and this decrease in efficiency can be in part counteracted by increasing the operating temperature. The division of the total quantity of catalyst over the different reaction zones makes it possible to maintain each individual catalyst bed at an operating temperature which corresponds to the activity of the catalysts, whereby better utilization of the catalysts is possible.

In FIG. 2, there is shown a flow sheet for production according to the invention of vinyl acetate from acetylene and acetic acid. An admixture of acetylene and acetic acid, which includes some recycled gas, is the reaction gas and flows through line 35 to reactor 21 wherein there are positioned as a plurality of serially connected spaced catalyst beds 25a, 25b, 25c, 25d. The catalyst is of such composition that it is effective to promote reaction of the reactants present in the reaction gas to form the vinyl acetate and the reactant is flowed serially through the catalyst beds so that contacting of admixture and catalyst is at a temperature and for a time sufficient to exothermically react the reactants and form the vinyl acetate.

After passage through the catalyst beds 25a–d, the reactant gas, which at this time contains the vinyl acetate produced during the contacting, discharges from the reactor 21, to line 40 and is flowed in line 40 to heat reclaimer 29, the operation of which will shortly be described. The reactant gas from the reactor flows through the heat reclaimer and into line 40a, which carries it to water condenser 26 and brine condenser 27. The reactant gas flows serially through these condensers and is cooled so that vinyl acetate, which is a relatively condensible component thereof, condenses as a condensate phase. Acetic acid which did not react in the reactor 21 also condenses in the condensers. As a consequence of the condensing operation, there is obtained a condensate phase and a cold gaseous phase. These phases are separated within the condensers, the condensate phase being withdrawn through line 41, and the cold gaseous phase being withdrawn from the condensers through line 57.

Any suitable form of condenser can be employed for the purpose of the invention. In the drawing, the condensers are the shell and tube type, the water condenser being provided with a tube bundle 43 having water inlet 44 and water discharge 45, and the brine condenser 27 being provided with a tube bundle 46 which has a brine inlet 47 and brine discharge 48.

The cold gaseous phase withdrawn from the condensers through line 57 contains acetylene and is recycled to the reactor. As the cold gaseous phase flows through line 57 a small quantity thereof is withdrawn from the system through line 42 so as to provide in the system a purge which will prevent the building up of impurities. Also, as the cold gaseous phase flows through line 57, make up acetylene is added thereto through line 24. The gaseous phase containing the make up acetylene is then passed through blower 28 which forces the cold gaseous phase containing make up acetylene back to the reactor. From the blower 28, the cold gaseous phase and make up gas enter line 29a a first portion which passes through line 29a and a second portion which passes through line 30. The first portion is passed through heat reclaimer 29 wherein it is heated by indirect heat exchange with reaction gas from the reactor 21. The heated effluent from the heat reclaimer passes through line 33 and there is introduced into this line acetic acid, in vapor phase, from line 32. The resulting mixture flows through preheater 34, which is provided with heating coil 31 having inlet 36 and outlet 37, and from the preheater flows through line 35 to the reactor 21.

The second portion of cold gaseous phase and make up acetylene which passes through line 30 is conducted thereby to header 39 to which there are connected branch lines 38. The branch lines 38 are provided with throttle valves 23, and conduct the gaseous material to within the reactor 21.

Each branch line is provided with a dispersing nozzle 40 and the gaseous material passed through the branch lines is discharged from the nozzle into the spaces between the adjacent catalyst beds in the reactor 21. The cold gaseous phase and make up acetylene then mixes with the reaction gas flowing serially through the catalyst beds, and is effective to cool the reaction gas so as to remove heat of reaction therefrom.

A feature of the invention is the provision of means for proportioning flow to the spaces intermediate the catalyst beds as desired. As shown in the drawing, this is done by providing valves in the branch lines 38 which direct cold gas to within the reactor 21. Provision of proportioning means allows the extent of cooling employed in the various sections of the reactor to be varied as is most desirable on the basis of the particular conditions obtaining. For example, when the catalyst of each of the beds has a different degree of activity, the amount of cooling can be modified in view of this varying degree of activity and so as to obtain optimum results.

For the production of vinyl acetate the feed to the reactor 21 passing through line 35 can be at a temperature in the range of 120 to 220° C. the particular temperature depending upon the reaction temperature maintained in the reactor. In general the reaction temperature will be in the range of 130 to 240° C. and is preferably in the range of 150–210° C. By cooling with cooling gas, the reaction gas flowing through the reactor, according to the invention, the temperature rise as the admixture flows through each catalyst bed can be a rise of from 1–12° C., i.e. the temperature can rise as little as 1° C. or as much as 12° C. as the reaction gas traverses each catalyst bed. Preferably the temperature rise is limited to a rise of 1–3° C. The cooling gas used for cooling can be at a temperature in the range of minus 20° to 50° C. and is preferably in the range of 10–20° C.

If desired, the flow sheet shown in FIG. 2, can include a by-pass line between the reactor discharge line 40 and the reactor feed line 35. Thus there can be provided, line 51 in which there is connected a blower 52 and in which there are installed valves 53 and 54. By manipulation of the valves, 53 and 54 in the by-pass line, a portion of the reactor effluent, can be recycled directly to the reactor.

To further provide for variation in the carrying out of the method, the blower 52 can be arranged to permit operating so that it is in series with flow through line 40 to the heat reclaimer 29. Thus, a line 58 can be connected with the discharge side of the blower 52 and a point in line 40 downstream of the blower inlet and a valve 56 can be installed in line 40 to permit the desired series connection of the blower.

*Example*

A reactor described in FIG. 1 is used in the following working example of the process of manufacturing vinyl acetate according to the invention. To show the flexibility of the process according to the invention the catalysts 2a–e bedded on the screen grids 3a–e are of different activities A, B, C, D and E. The general composition of the catalyst is 30% zinc acetate on 70% activated carbon, catalyst 2a being new, catalyst 2b and 2c having a working age of 45 days and 2d and 2e a working age of 90 days. Through the inlet opening 4 a reaction gas having a temperature of 170° C. composed of

| 79.7% acetylene | 6.9% vinyl acetate |
| 11.4% acetic acid | 2.0% inerts | is introduced at a rate of 5294 Nm.³/hour into a reactor having an overall volume of 65 m.³ and containing 1560 kg. catalyst per 1000 m.³/hour input disposed in 5 beds of equal quantities. The temperature of the reaction gas after the first catalyst bed 2a has risen to 180° C. The production in the first bed with a temperature rise of 10° C. is 124 kg./hour vinyl acetate.

Through the nozzle 7b are introduced 404 m.³/hour of a gas mixture consisting of 93.5% acetylene and 6.5% other components such as for example acetic acid and vinyl acetate and inerts having a temperature of 40° C., so as to reduce the temperature of the reaction gases to 170° C. In a similar manner as before the gases are led through the second catalyst bed 2b in the general flow direction, with a production of 134 kg./hour of vinyl acetate. The slight reduction of production due to the diminished acetic acid concentration in the reaction gases is compensated by allowing a somewhat higher reaction temperature, as in the first catalyst bed 2a.

Through the nozzle 7c, in this example, there are not introduced any cooling gas the temperature of the reaction mixture remaining thereby at 180° C., since this catalyst having a working age of 45 days, needs this temperature for a proper reaction.

In the third catalyst bed 2c the reaction gases warm themselves up to 190° C., the production of vinyl acetate being 134 kg./hour. Cooling gases of the same specification as before are introduced at a rate of 399 m.³/hour through nozzle 7d thereby reducing the temperature of the reaction gases to 180° C.

In the fourth catalyst bed 2d the reaction proceeds as before, producing 142 kg./hour vinyl acetate. Again the reaction gases are cooled by introduction through nozzle 7e of 80.5 m.³/hour cooling gases of still the same specifications as described previously, cooling thereby the reaction gases to 188° C., and further reaction proceeds in catalyst bed 2e producing 144 kg./hour vinyl acetate. The reacted gases leave now the reactor with a temperature of 198° C., to be further processed for example according to the method of the flowsheet of FIG. 2 thereby separating the produced vinyl acetate. Yield of the reaction is 60% of the feed in acetic acid.

The foregoing example shows that in a very simple way the best reaction conditions suited to the state of the catalyst can be choosen in each catalyst bed, allowing for optimum working conditions, with regard to yield, catalysts life and energy consumption.

We claim:

1. The method of producing vinyl esters which includes passing a first portion of a reactant gas comprising as reactants acetylene and a lower alkanoic acid serially through two spaced catalyst beds, introducing a second portion of said reactant gas intermediate said catalyst beds, admixing said first and second portion intermediate said catalyst beds and passing the resulting admixture through the second catalyst bed, the catalyst of said catalyst beds being effective to promote reaction of said reactants to form vinyl esters and the reactant gas passed through each catalyst bed being contacted with the catalyst thereof at a temperature and for a time sufficient for exothermic reaction of the reactants to form vinyl esters, said second portion of reactant gas at the time of said admixing being at a lower temperature than the temperature of said first portion at the time of said admixing, whereby heat of reaction is removed from the first portion and the first portion is cooled before being passed through said second catalyst bed and the temperature rise of reactant gas passed through the catalyst beds is limited.

2. The method of claim 1 in which the product is vinyl acetate and the reactant gas is an admixture of acetylene and acetic acid.

3. The method of claim 1 in which the product is vinyl acetate and the reactant gas is an admixture of acetylene and acetic acid, the reaction temperature being in the range of 130 to 240° C.

4. The method of producing vinyl esters which comprises admixing as reactants to form a reactant gas acetylene and a lower alkanoic acid, passing the reactant gas serially through a plurality of spaced catalyst beds, each containing catalyst effective to promote reaction of said reactants to form vinyl esters, contacting said reactant gas with each catalyst bed at a temperature and for a time sufficient to exothermically react said reactants forming vinyl esters, cooling the reactant gas containing vinyl esters after passing the reactant gas through said beds to form a condensate phase containing vinyl esters and a cold gaseous phase containing acetylene, mixing a part of the cold gaseous phase with said reactant gas in the spaces between adjacent catalyst beds as said reactant gas is flowed between the beds, whereby heat of reaction is removed from the reactant gas and the temperature rise of the reactant gas during the passage thereof through each catalyst bed is limited.

5. The method of producing a vinyl ester which comprises admixing as reactants to form a reactant gas acetylene and a lower alkanoic acid, flowing the reactant gas serially through a plurality of spaced catalyst beds, each containing catalyst effective to promote reaction of said reactants to form vinyl esters, contacting said reactant gas with each catalyst bed at a temperature and for a time sufficient to exothermically react said reactants forming vinyl esters, cooling the reactant gas containing vinyl esters after passing the reactant gas through said beds to form a condensate phase containing vinyl esters and a cold gaseous phase containing acetylene, separating said phases, dividing the cold gas phase into a first portion and a second portion, heating said first portion and passing it through said catalyst beds with said reactant gas, and mixing at least a part of the second portion with said reactant gas in the spaces between adjacent catalyst beds as said reactant gas is flowed between the beds, whereby heat of reaction is removed from the admixture and the temperature rise of the admixture during passage thereof through each catalyst bed is limited.

6. The method of claim 5 in which the product is vinyl acetate and said reactant gas comprises acetylene and acetic acid.

7. The method of claim 5 in which the product is vinyl acetate and said reactant gas comprises acetylene and acetic acid, the reaction temperature being in the range of 130 to 240° C.

8. The method of claim 1, in which said first portion of gas is introduced at a temperature in the range of 120–220° C.

9. The method of claim 1, in which said second portion of gas is introduced at a temperature in the range of minus 20 to 50° C.

10. The method of claim 1, in which the temperature rise, as the admixture flows through the catalyst bed, is in the range of from 1–12° C.

11. The method of claim 5, in which said first portion of gas is introduced at a temperature in the range of 120–220° C.

12. The method of claim 5, in which said second portion of gas is introduced at a temperature in the range of minus 20 to 50° C.

13. The method of claim 5, in which the temperature rise, as the admixture flows through the catalyst bed, is in the range of from 1–12° C.

References Cited in the file of this patent

UNITED STATES PATENTS

| 2,547,916 | Wenner | Apr. 3, 1951 |
| 2,552,425 | Halbrig | May 8, 1951 |